United States Patent
James (10) Patent No.: US 11,536,821 B2
(45) Date of Patent: Dec. 27, 2022

(54) APPARATUS AND METHOD FOR REDUCING COLLISION RISKS

(71) Applicant: Saronikos Trading and Services, Unipessoal LDA, Funchal/Madeira (PT)

(72) Inventor: Robert James, Hatfield (GB)

(73) Assignee: Saronikos Trading and Services, Unipessoal LDA, Madeira (PT)

( * ) Notice: Subject to any disclaimer, the term of this patent is extended or adjusted under 35 U.S.C. 154(b) by 362 days.

(21) Appl. No.: 16/091,022

(22) PCT Filed: Apr. 5, 2016

(86) PCT No.: PCT/EP2016/057386
§ 371 (c)(1),
(2) Date: Oct. 3, 2018

(87) PCT Pub. No.: WO2017/174115
PCT Pub. Date: Oct. 12, 2017

(65) Prior Publication Data
US 2019/0064334 A1    Feb. 28, 2019

(51) Int. Cl.
*G01S 11/06*    (2006.01)
*G08G 1/16*    (2006.01)
(Continued)

(52) U.S. Cl.
CPC .............. *G01S 11/06* (2013.01); *G01S 11/14* (2013.01); *G08G 1/161* (2013.01); *G08G 1/162* (2013.01);
(Continued)

(58) Field of Classification Search
CPC ........ G08G 1/166; G08G 1/165; H04W 84/18
See application file for complete search history.

(56) References Cited

U.S. PATENT DOCUMENTS 5,153,836 A  *  10/1992  Fraughton ............. G01S 5/0009
                                                        340/961
5,298,883 A      3/1994  Pilney et al.
(Continued)

FOREIGN PATENT DOCUMENTS

WO      2004/085211 A2    10/2004

OTHER PUBLICATIONS

Khairnar et al. "Performance of Vehicle-to-Vehicle Communication Using IEEE 802.11p in Vehicular Ad-hoc Network Environmnet." Internaitonal Journal of Network Security and Its Applications, vol. 5, No. 2. Mar. 2013. pp. 143-170. (Year: 2013).*
(Continued)

*Primary Examiner* — Gregory C. Issing
(74) *Attorney, Agent, or Firm* — Workman Nydegger (57) ABSTRACT

An apparatus and a method for reducing collision risks between an entity and at least an obstacle, wherein the apparatus includes a transmitter adapted to emit a first beacon signal apt to avoid a collision, a receiver adapted to receive at least a second beacon signal that can be emitted by another apparatus which could dangerously approach to the apparatus, a processor configured for detecting at least the second beacon signal received through the receiver, detecting at least a property of at least the second beacon signal, determining, on the basis of the at least one property of the second beacon signal, at least a property of the first beacon signal, and emitting the first beacon signal through the transmitter in order to reduce collision risks.

15 Claims, 6 Drawing Sheets

(51) Int. Cl.
*H04W 84/18* (2009.01)
*G01S 11/14* (2006.01)
*G01S 11/10* (2006.01)

(52) U.S. Cl.
CPC ............ *G08G 1/165* (2013.01); *G08G 1/166* (2013.01); *H04W 84/18* (2013.01); *G01S 11/10* (2013.01)

(56) References Cited

U.S. PATENT DOCUMENTS

| | | | | |
|---|---|---|---|---|
| 5,506,587 | A * | 4/1996 | Lans | G01S 5/0072 |
| | | | | 342/357.31 |
| 6,754,250 | B2 * | 6/2004 | Haartsen | H04B 1/713 |
| | | | | 375/132 |
| 7,265,665 | B2 * | 9/2007 | Bouchard | B60R 25/102 |
| | | | | 340/539.11 |
| 7,733,842 | B2 * | 6/2010 | Yang | H04W 48/16 |
| | | | | 370/350 |
| 8,169,338 | B2 * | 5/2012 | Mudalige | G08G 1/167 |
| | | | | 340/901 |
| 8,436,751 | B2 * | 5/2013 | Haran | G08G 1/161 |
| | | | | 340/995.1 |
| 8,560,609 | B2 * | 10/2013 | Nathanson | H04L 69/04 |
| | | | | 709/204 |
| 8,634,352 | B2 * | 1/2014 | Smith | H04W 74/002 |
| | | | | 370/328 |
| 9,084,190 | B2 * | 7/2015 | Noh | H04W 84/18 |
| 9,532,194 | B2 * | 12/2016 | Zhang | H04W 64/006 |
| 10,002,536 | B2 * | 6/2018 | Kim | G08G 1/0962 |
| 2003/0035406 | A1 * | 2/2003 | Fraser | H04M 1/72513 |
| | | | | 370/347 |
| 2008/0186206 | A1 * | 8/2008 | Reumerman | H04L 12/18 |
| | | | | 340/902 |
| 2012/0299713 | A1 | 11/2012 | Elia et al. | |
| 2013/0069815 | A1 * | 3/2013 | Smith | G08G 5/04 |
| | | | | 342/30 |
| 2013/0281140 | A1 * | 10/2013 | Rubin | G01C 21/3658 |
| | | | | 455/500 |
| 2019/0064334 | A1 * | 2/2019 | James | G08G 1/165 |

OTHER PUBLICATIONS

Jurgen, R. "V2V/V2I Communications for Improved Road Safety and Efficiency." SAE International Progress in Technology Series. Sep. 2015. pp. 1-185. (Year: 2015).*
International Search Report dated Oct. 5, 2016, issued in PCT Application No. PCT/EP2016/057386, filed Apr. 5, 2016.
Written Opinion dated Oct. 5, 2016, issued in PCT Application No. PCT/EP2016/057386, filed Apr. 5, 2016.

* cited by examiner

APPARATUS AND METHOD FOR REDUCING COLLISION RISKS

BACKGROUND OF THE INVENTION

Field of the Invention

In its most general aspect, the present invention relates to an apparatus and a method for reducing collision risks between an entity (e.g., a mobile phone user) and at least an obstacle; in particular, to reduce collision risks when a user is interacting with his/her mobile device without paying attention to his/her walking path.

Description of Prior Art

It is well-known that unexpected collisions between two people at even low/modest speeds (2-4 km/h; 1.24-2.48 mi/h) can be dangerous and cause injuries, because a person who is inattentive does not prepare himself/herself to the effects of an imminent collision.

The collisions are often produced by people who are interacting with their mobile devices (like smart phones, tablet, or the like). This human-device interaction distracts the user, who becomes heedless of the surrounding environment, increasing the chance that him/her may collide with other people or obstacles.

In order to reduce the collisions risk, the U.S. patent application No. 2012/0299713 to ELIA et al. describes a method and system for alerting a user of a mobile communication device about a risk arising from proximate drivers or pedestrians. The method comprises the following steps: receiving a list of a plurality of proximate mobile communication devices from a central unit via a network, establishing a peer to peer (P2P) connection with each the proximate mobile communication device, acquiring positioning data from each the proximate mobile communication device via the respective P2P connection, locally calculating at least one potential collision course with at least one of the plurality of proximate mobile communication devices according to the positioning data, and locally presenting an alert indicative of a risk to the user according to the at least one potential collision course.

This system has a main drawback in that it requires that each mobile communication device has to receive a list of the proximate mobile communication devices, resulting this system ineffective in an unmanaged environment (i.e., in an environment where mobile communication networks are not present); furthermore, this system does not take into the account the status of the device users, i.e., whether the users may be inattentive or not.

SUMMARY OF THE INVENTION

The present invention aims to solve these and other problems by providing an apparatus and a method for reducing collision risks between entities and obstacles.

The main idea of the present invention is the broadcast of beacon signals by apparatuses carried by potential obstacles (including fixed obstacles and people), in order to signal their presence and warn of collision risks. At least one of said beacon signals is then received by an apparatus, which detects at least a property of said beacon signal, determines, on the basis of said at least one property of said beacon signal, at least a property of a further beacon signal, and emits said further beacon signal through the transmitting means.

In this way, it is possible to increase the detection probability of said beacon signals, as the probability that said beacon signals interfere with each other is reduced. This is achieved without using a centralized architecture and makes it possible to lower the probability of collisions between entities and obstacles in an unmanaged environment.

Said alerting apparatus is preferably configured to be a peer in a self-standing Peer Group, where some data are shared using only unidirectional communications and alerting apparatuses can freely join in or leave, so that the alerting functionality that the apparatus provides can work in any kind of environment without relying on any central unit, or master station, or synchronization server, or network that can relay information.

A frequency hopping technique is preferably used for operation in unlicensed frequency bands and the relevant timings are aligned among the apparatuses of a Peer Group notwithstanding each apparatus has its own clock running independently from the others.

For equipping unattended obstacle that have to provide a beacon signal which does not require the emission of alerting signals, the invention foresee a sub-type of apparatus, called warning apparatus, that, with respect to a regular alerting apparatus, miss the ability to assess collision risks and emit alerting signals. Throughout this specification, the annexed drawing and claims, the term "alerting apparatus", or "apparatus" tout court, makes reference to both the "regular alerting apparatus" and the "warning apparatus", unless a specific reference to one of them is made.

Further advantageous features of the present invention are the subject of the attached claims.

BRIEF DESCRIPTION OF DRAWING

The features of the invention are specifically set forth in the claims annexed to this description; such characteristics will be clearer from the following description of a preferred and non-exclusive embodiment shown in annexed drawings, wherein:

DETAILED DESCRIPTION OF THE INVENTION

In this description, any reference to "an embodiment" will indicate that a particular configuration, structure or feature described in regard to the implementation of the invention is comprised in at least one embodiment. Therefore, the phrase "in an embodiment" and other similar phrases, which may be present in different parts of this description, will not necessarily be all related to the same embodiment. Furthermore, any particular configuration, structure or feature may be combined in one or more embodiments in any way deemed appropriate. The references below are therefore used only for the sake of simplicity, and do not limit the protection scope or extension of the various embodiments.

Figure 1:
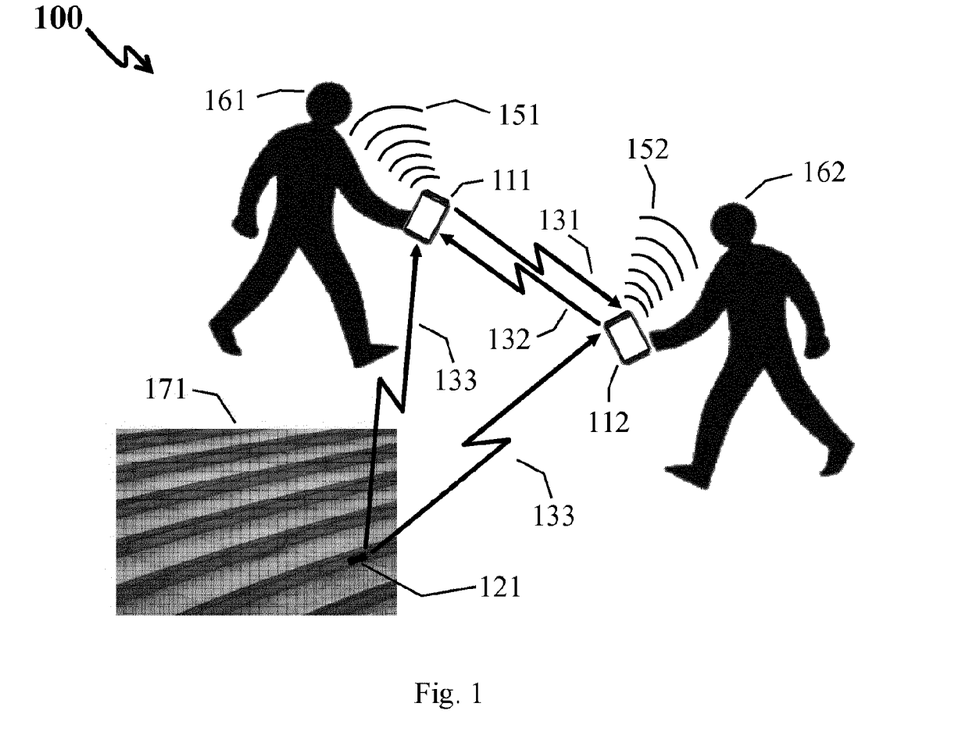
FIG. 1 shows a scenario of collision risks comprising two (regular) alerting apparatuses and one warning apparatus according to the invention.
Figure 2:
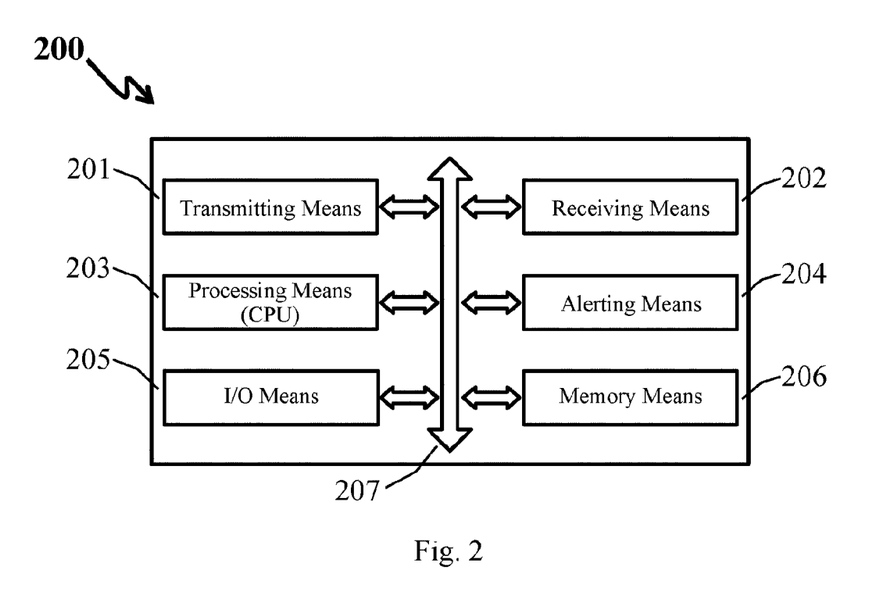
FIG. 2 shows the main elements relevant to the alerting functionality of an alerting apparatus depicted in FIG. 1.

To better understand the characteristics that are described in what follows, the reader should consider that the present invention is mainly focused on a scenario where only slow moving entities are concerned (e.g., pedestrians, electric buggies, "hoverboards", or the like), and where those entities can be found not only outdoor, but also in indoor places where one cannot rely on any communications network or common control apparatus. To cope with such conditions, the apparatuses involved in the alerting scenario gather in a self-standing Peer Group. Such a scenario is now illustrated also with reference to FIG. 1 and FIG. 2, showing that the warning functionality basically is provided by a first and a second (regular) alerting apparatuses 111,112 (e.g., a mobile phone, a smartphone, a tablet, a wearable device such as a smartwatch, smart-glasses, or the like) comprising a set of elements 200 shown in FIG. 2. Said first and second alerting apparatuses 111,112 are configured for emitting a beacon signal 131,132, receiving at least one beacon signal 132 and 131 emitted by a regular alerting apparatus or a warning apparatus 133, detecting at least one signal property of said at least one received beacon signal, and, on the basis of said at least one signal property, emitting an alerting signal (151, 152, respectively).

The set of elements 200, providing a Warning Functionality, essentially comprise six main elements, which can be described also with reference to FIG. 2:

transmitting means 201, adapted to generate and emit a beacon signal 131,132,133;

receiving means 202, adapted to receive and decode beacon signal 131,132,133;

processing means 203, like a Central Processing Unit (CPU), configured for executing a set of instruction for managing the elements implementing the Warning Functionality, carrying out computational tasks, detecting at least one property of a received beacon signal, and assessing a collision risk on the basis of said detected property;

alerting means 204 (e.g., an audio speaker driven by an audio adapter, a vibration generator, or the like), which is adapted to produce an alerting signal 151,152, preferably for alerting the user 161,162 of said apparatus that an obstacle is approaching to him/her and/or that he/she is getting closer to an obstacle;

I/O means 205, adapted, for example, to load and update data and instruction, issue and receive commands, receive and emit audio signals, display information and pictures; such I/O means 205 may comprise, for example, USB, Firewire, RS232, IEEE 1284, Ethernet, or WiFi adapters, audio speaker, vibration generator, touch screen or the like and other adapters;

memory means 206, adapted to contain at least the data and instructions used by the other elements of the apparatus and, in particular, by the processing means 203;

a communication bus 207, which allows the exchange of information among the elements of the set 200.

As an alternative to using the communication bus 207, the transmitting means 201, the receiving means 202, the processing means 203, the alerting means 204, the I/O means 205, and the memory means 206 can be connected through a star architecture.

With respect to a regular alerting apparatus, a warning apparatus 121 does not determine the collision risks, and does not comprise the alerting means 204.

It is to be appreciated that the alerting apparatus (111, 112), and, in particular, the logical set 200 does not provide bi-directional communications, but just the ability to emit a beacon signal and the ability to receive beacon signal, without any relationship between the contents of the two beacon signals; conversely, the timings of the two signals are synchronized as explained in what follows, since the beacon signal has to be emitted with a timing consistent with that of received beacon signal(s). FIG. 1 highlights that transmission and reception of beacon signals is not a two way communication by showing, between alerting apparatuses 111 and 112, two lines with one arrow end instead of a single double arrow line.

On the other hand, any alerting apparatus can contemporaneously receive beacon signals coming from a number of other alerting apparatuses, as explained in what follows.

The alerting apparatuses do not rely on any cable/wire network, or external synchronization means, or control centre, or master apparatus. Each alerting apparatus has in fact its own internal clock that does not need to be synchronized with any external source. However, the alerting apparatuses belonging to a Peer Group can align their timings, as explained in what follows.

The said processing means 203 of the apparatus 111,112 are configured for performing the following activities:

detecting at least a second beacon signal 131,132,133 received through the receiving means 202;

detecting at least a property of at least said second beacon signal 131,132,133;

determining, on the basis of said at least one property of said second beacon signal, at least a property of a first beacon signal 131,132,133;

emitting said first beacon signal through the transmitting means 201, in order to reduce collision risks.

Figure 3:
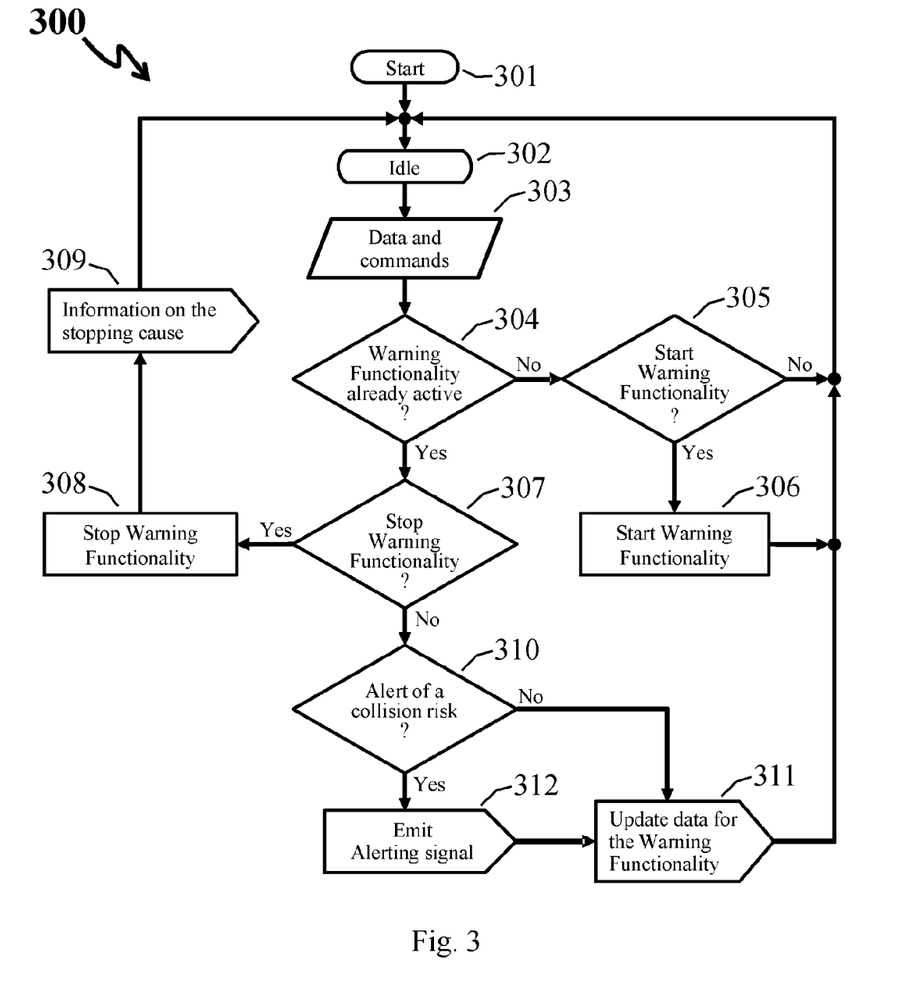
FIG. 3 shows a flow chart depicting the operation of the alerting apparatus illustrated in FIGS. 1 and 2.

The operation of the transmitting means 201 and the receiving means 202 of the logical set 200 is achieved by a particular technique used to access the transmission channels, which is explained in what follows, also with reference to FIGS. 4-8. Before that explanation, an overview of the way the alerting apparatus (111,112) works is now described also with reference to FIG. 3, considering the following main steps:

301 Start;

302 Idle state, to wait for data or commands;

303 Data and commands, to get data and commands from input means, adaptors, interfaces, processing means 203, or others elements and I/O means 205. In particular, input commands can require the activation or deactivation of the Warning Functionality and the emission of an alerting signal, as will be said in more details in what follows;

304 Determination on the Warning Functionality: if the Warning Functionality is active the process continues to step 307, otherwise it continues to step 305;

305 Determination to start the Warning Functionality: if the commands or data received at step 303 require the activation of the Warning Functionality, the process continues to step 306, otherwise it goes back to step 302;

306 Start the Warning Functionality, according to decision 305. Then the process goes back to step 302;

307 Determination to stop the Warning Functionality, given that at step 304 the determination was that the Warning Functionality was active: if the commands or data received at step 303 require to stop the Warning Functionality, the process continues to step 308, otherwise it goes back to step 310;

308 Stop the Warning Functionality, according to decision 307;

309 Output of information on the stopping cause of the Warning Functionality, according to the data and commands received at step 303. After step 309 the process goes back to step 302;

310 Determination to alert: if the data received at step 303 indicate a collision risk and require the emission of an alerting signal, the process continues to step 312, otherwise it continues to step 311;

311 Update data for the Warning Functionality: according to data and commands received at step 303, the process sends updating information to the relevant elements of the alerting apparatus 111,112;

312 Emit Alerting Signal: according to data and commands received at step 303, the process issues a command to output an alerting signal 151,152 from the alerting apparatus (111,112). Then the process continues to step 311.

The above process continues to iterate until when, at step 303, the processing means 203 receive a stopping command from one of the elements of the alerting apparatus 111,112, including those of the logical set 200. In fact, the Warning Functionality can be stopped upon the occurrence of some events, such as, for example, the switching off of a display or the detection of particular conditions (e.g., missed reception of beacon signals for a given time interval, lack of communications channels), or the like.

On the other hand, the above process can start by a manual operation of the user or upon the occurrence of some events, such as, for example, the activation of a display of the alerting apparatus 111,112. One can in fact suppose that, when the apparatus display is active, the attention of the user is kept on it and the user is not attentive to what is happening around and does not watch his/her step. As another example, the activation of the Warning Functionality could occur because of a sudden rise of acoustic noise. The skilled person, however, could indicate a number of other activation events appropriate to the conditions of use of the alerting apparatus.

Basically, the regular alerting apparatus 111,112 radiates its beacon signal 131,132 when it is likely that the level of attention of its user is low, and the people around him/her have to be warned, while the warning apparatus 121 radiates its beacon signals when somebody, or some command coming from an external entity, activates it.

As far as the alerting signal 151,152 is concerned, it is assumed that it can be emitted through regular means of the alerting apparatus 111,112, such as loudspeakers, vibrators, displays, and the like.

In order to determine whether a collision risk exists, the processing means 203 is configured for determining at least the distance of the source emitting a received beacon signal. Additionally, the processing means 203 could be able to determine whether a source of a beacon signal is approaching or moving away, the speed of the relative motion, that is the speed at which the distance of that source is increasing or decreasing, and the acceleration of the relative motion.

A signal property suitable for determining the distance of an entity emitting a beacon signal is the power of the received beacon signal. By comparing this power against the power at which that beacon signal is emitted by its source, which is supposed to be known, the processing means 203 assesses the distance of the source, as the skilled person knows. Given that, under the conditions of interest, the source of the beacon signal and the apparatus to be alerted are in the line of sight, the accuracy of this kind of assessment can be acceptable. For this purpose, it is also possible to define a standard power level for the beacon signal, which provides a common understanding between the used devices to derive the distance by assessing the power level of the received beacon signal.

To assess the speed of the relative motion, the processing means 203 takes, for example, said distance at different points in time and compute the ratio of the distance change to the relevant time interval. Likewise, the processing means 203 can compute the acceleration of the relative motion by taking the ratio of the speed variation to the time interval during which the variation occurred.

The skilled person can devise other methods and techniques to assess the distance and the relative speed and acceleration of a beacon signal source. For example, if the carrier wave of the beacon signal 131,132,133 is an ultrasound wave, one can derive the relative speed of the motion by the well known Doppler shift (the change in frequency of a wave for an observer moving relative to the wave source).

If only the distance of the source of a beacon signal 131,132,133 is taken into account to assess the collision risk, the processing means 203 can simply determine if the received power of the beacon signal exceeds a given threshold, corresponding to a safe distance. In this case, for example, the alerting apparatus 111,112 starts emitting an alerting signal when that threshold is exceeded and the emission continues as long as that condition persists. Moreover some properties of the emitted alerting signal (e.g., volume, tone, pulse rate, and others) can be varied as a function of distance (e.g., increasing pulse rate with decreasing distance).

If, instead, the relative speed and acceleration are considered as well, more sophisticated algorithms can be applied to assess the collision risk, such as the assessment of the time instant at which a collision could occur (e.g., by the equation giving the distance as a function of time, acceleration, and initial velocity). In this case, the alerting signal may be emitted when one or a combination of number of conditions are met, such as:

collision is expected within a given time interval;
distance is shorter than a given distance threshold;
approaching speed is higher than a given speed threshold;
acceleration is higher than a given acceleration threshold.

Moreover the above thresholds could be made dependent on particular characterization of the beacon signal, as said in what follows. In this case the properties of the emitted alerting signal can be varied not only as a function of distance, but also as a function of time to collision, speed, acceleration, and said characterization of the beacon signal.

Generally speaking, the processing means 203 can be configured for assessing the value and the temporal evolution (derivatives) of at least one property of the received beacon signal, and on their basis it can set a number of conditions for emitting an alerting signal 151,152 and characterize at least one of the alerting signal 151,152 properties. This can advantageously reduce the probabilities of false alarms (false positive) and missing alerts (false negative).

The beacon signal produced by the transmission means 201 is a modulated carrier wave, preferably of electromagnetic nature, in the frequency range of radio waves; however, the skilled person could devise the use of other types of carrier waves (e.g., ultrasounds) without departing from the teaching of the present invention. The content of the beacon signal will be described in what follows.

The transmission technique can be one of those compatible with the type of the adopted carrier wave, including, for example, transmission techniques similar to those of Bluetooth or WiFi or others. It is to be appreciated that an alerting apparatus 111,112 or a warning apparatus 121 could contemporarily emit its beacon signal by a number of such techniques, so that a variety of apparatuses could receive them.

A specific example of transmission technique will be described in what follows, also with reference to FIGS. 4-8, showing how emission and reception of such beacon signals can be obtained within a Peer Group of apparatuses consisting only of alerting apparatuses according to the invention, without any master station, any common synchronization means, any central unit, any network that can relay information, while assuming that any alerting apparatus can come into or go out the reception range of any other alerting apparatus.

To simplify explanations and ease understanding, the description of the technique will mostly make reference to a transmission system utilizing a carrier wave similar to that of Bluetooth. The skilled person may however understand that transmissions techniques having characteristics different from the ones cited above (e.g., WiFi like, ultrasounds), can be used as well without departing from the teaching of the present invention.

Figure 4:
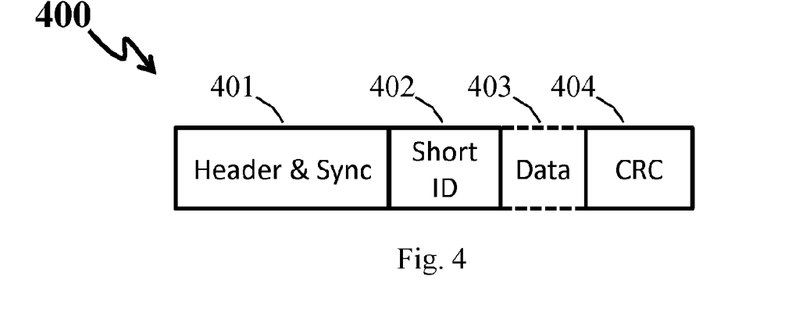
FIG. 4 shows an example of data packet carried by a beacon signal (beacon packet)

The beacon signal 131,132,133, produced by the transmitting means 201, is preferably a regular sequence of carrier bursts that carry a data packet 400 (beacon packet) similar to that depicted in FIG. 4. The beacon packet 400 comprises at least:

header 401, including at least a preamble, labelling the packet as a beacon packet of a beacon signal according the present invention, and a synchronization word, allowing the receiving means 202 to acquire symbol synchronization and detect the beacon packet fields;

short ID 402, to distinguish each beacon signal from other beacon signals received by the same receiving means 202;

a CRC (Cyclic Redundancy Check) 404, for checking transmission errors and protecting packet content.

Possibly a "Data" field 403 (dashed in FIG. 4) could be added in the beacon packet to carry auxiliary data.

As the number of alerting apparatuses that can be found within the reception range of an alerting apparatus is small, the short ID 202 can consist of few bits. Preferably it can be a random code generated by the processing means 203, when the alerting apparatus joins, or creates, a group of apparatuses sharing the same transmission resources, as explained in what follows. Anyhow, the short ID can be provided in many different ways, as the skilled person knows. In fact, it can be generated by the apparatus itself at any time, or derived from other identification codes (e.g., Bluetooth Device ID, IMEI—International Mobile station Equipment Identity), or it could be stored in a firmware, or set by the user, or the like. In particular, the apparatus can generate an its own short ID before starting the emission of its beacon signal in a new Peer Group, ensuring that the generated ID is different from all the ID that are in use by the apparatuses that are within its reception range.

An ID code allows a better management and assessment of the collision risks, as it allows a tracing of the individual behaviour of the apparatuses that are within the reception range.

Moreover, for differentiating the alerting signal as a function of the type of the apparatus emitting the beacon signal, it could be useful to have, in the beacon packet 400, a short code classifying the apparatus in "classes". A simple example of such classification is using a bit to distinguish warning apparatuses 121 from alerting apparatuses 111,112. By detecting such a bit, the processing means 203 can differentiate the alerting signal 151,152, allowing the user (161,162) to distinguish the risk of collision with a warning apparatus from the risk of collision with an alerting apparatus. Such a bit could be part of the short ID 402 or could be in the "Data" field 403. The skilled person can devise a number of classifications of the apparatuses and different ways to carry the relevant information within the beacon packet 400.

In any case the beacon packet can consist of a small number of bits (e.g., in the range 100-150), and, if a suitable transmission bit rate is used, the carrier bursts can be short. To understand the rationale of the novel access scheme that is described in what follows, also with reference to FIGS. 5-8, it is useful to consider an example of application with plausible values for its parameters.

The example is given for illustrative purposes only and is not to be considered limitative in any respect. The skilled person, in fact, can apply the described concepts in many quite different cases.

The description that follows is made by considering the transmission system from the point of view of one of the active apparatuses that are found in a given area. That apparatus will be called "target apparatus", but the reader must bear in mind that all the alerting and warning apparatuses are peers and any of them could be taken as the target apparatus.

In this descriptive example it is assumed that a short-range radio system is used to emit the beacon signals (e.g., a radio system using carrier waves of Bluetooth type), and that any alerting apparatus has to take into account a maximum of 30 alerting apparatuses for collision risks. If more than 30 alerting apparatuses are within the reception range of the target apparatus, the target apparatus neglects the most distant ones, as if the most distant ones were out of its reception range. Alternatively if the number of alerting apparatuses exceeds a certain predefined number, the warning functionality may adopt a specific state to save the battery, for example in situations where it is typical that a high number of alerting apparatuses may rise, such as in stadiums, on concerts and the like.

The maximum approaching speed of two apparatuses is assumed to be 3 m/s.

The carrier wave is a radio wave preferably in an unlicensed band, where 100 or more radio channels are available. The burst duration, including guard times, is 0.1 ms. We assume that the carrier burst of each beacon signal repeats regularly every 10 ms. Thus every 10 ms the target apparatus has the opportunity to assess the distance of the apparatuses within its reception range. Considering the maximum speed of 3 m/s, the maximum distance variation between two consecutive distance samples is 3 cm. This is considered a more than acceptable value. In what follows a double value (6 cm) will be considered acceptable as well.

Considering the above assumptions, a time division access scheme is devised, whereby each alerting apparatus emits its beacon signal in a time slot of a given radio channel without overlapping with other beacon signals that are within its reception range. The time slot length is the same as that of the carrier burst, i.e., 0.1 ms, as this includes, as said above, guard times to compensate for possible synchronization misalignment and time jitters.

Figure 5:
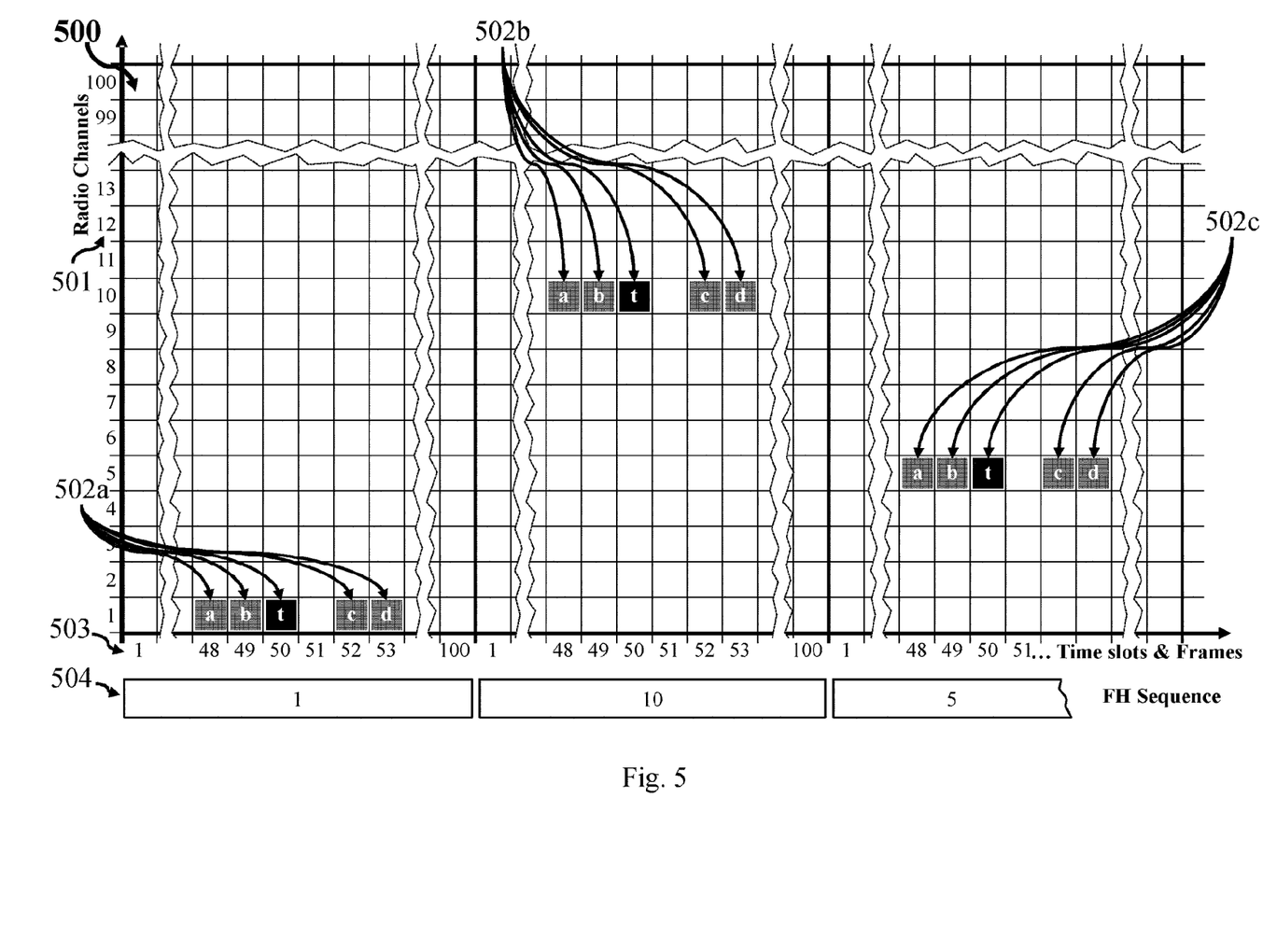
FIG. 5 shows an illustrative chart highlighting the basic concepts of a transmission frame suitable for an embodiment of the invention.

As the burst of all the beacon signals repeats regularly every 10 ms, the target apparatus can consider them as organized in a periodic frame (target frame) with period of 10 ms (in what follows it is explained how the apparatuses of a Peer Group get synchronized and how the target apparatus set the frame timing). Hence the target frame includes 100 time slots (10 ms/0.1 ms). FIG. 5 shows an example of three frame periods of a target frame with a frequency hopping technique, that will be described in what follows. The vertical axis represents the radio resources in terms of radio channel (the 100 radio channel assumed for the example). The horizontal axis represents a time scale in terms of time slots (100 time slots per frame).

That example shows the time slots occupied by a Peer Group of five apparatuses, labelled "a", "b", "c", "d", and "t", where "t" denotes the time slot used by the target apparatus. As explained below, generally the used time slots are gathered around the frame centre and are not consecutive (in the example of FIG. 5, time slot 51 is vacant). This is due to the fact that the occupancy of the time slots is somewhat random, as the apparatuses can join or leave the Peer Group at any time, while a reordering of the time slot occupancy is possible, but it cannot be achieved perfectly in any condition or in real time. On the other hand, it is not required that the time slot occupancy be continuous, but it will be understood that it offers some advantage.

It is to be appreciated that each apparatus belonging to the Peer Group represented in FIG. 1 defines its own target frame that can be different from those of its peers. Each of them can in fact have different apparatuses within its reception range and can set the beginning of its frame at a different point in time. For example, apparatus "c" can miss, in its reception range, apparatuses "a" and "d", while in its reception range can have another ten different apparatuses. Moreover in the target frame of apparatus "c", the apparatuses "b", "t", and "c" could occupy the time slots 48, 49, and 51 instead of 49, 50, and 52, as the timing of the target frame relevant to "c" can be shifted with respect to that shown in FIG. 1. The skilled person could devise a more complex embodiment of the invention where the timing of the target frames relevant to some apparatuses could be aligned, but this alignment is not essential.

The essential thing is that target apparatus "t" receives the beacon signal bursts of the apparatuses belonging to its Peer Group in a sequence of non overlapping time slots. This implies that the apparatuses of the Peer Group have their time slots aligned. The method to achieve this alignment will be described after the description the Frequency Hopping (FH) technique used in the present invention and the way by which the apparatuses get synchronized to the FH sequence.

As the transmission system of the invention is supposed to operate in an unlicensed frequency band, it is advisable to adopt a technique allowing the disturbances that can interfere reception to be averaged over the radio channels of that band and, conversely, to spread over those radio channels the interferences that the beacon signals create to other transmission systems. To this purposes, the preferred embodiment of the invention uses Frequency Hopping schemes that meet the particular conditions of the present invention. From one hand, in fact, the requirements are less demanding with respect to other transmission systems, in that, e.g., the beacon signals generally occupy a low percentage of the time slots of the radio channels and have intrinsically a random characteristic, considering that they have a low transmission range and are mostly emitted by moving apparatuses. On the other hand, the apparatuses of the present invention cannot rely on a central unit, or master station, or synchronization server, or any network that can relay information, therefore they have to synchronise without any external reference. Moreover they have to get synchronization as quickly as possible, in order that the warning functionality can get its actual operation soon after an apparatus joins a new Peer Group.

Therefore, in the preferred embodiment of the invention, the frequency hopping scheme is of a type similar to the example depicted in FIG. 1, which shows that, in each frame period, all the beacon signals of a target frame use time slots 503 of the same radio channel 501, and the used radio channel changes every frame period, according to the frequency hopping sequence 504. In the example of FIG. 5, the apparatuses of the Peer Group use channel 1 in the first frame, channel 10 in the second frame, channel 5 in the third frame, and so forth. Moreover, in the preferred embodiment of the invention the FH sequence has a length equal to the number of the radio channels that the beacon signals can use, and repeats cyclically, so that in each cycle of the FH sequence all the radio channels are used once.

With the FH sequence assumed above, the detection of the Peer Groups, that is described in what follows, can be quick, while the spreading effectiveness is good enough for the operation of the invention. However the skilled person can indicate other spreading techniques, more or less simple, that can anyway work, considering that, as rule of thumb, the simpler the spreading scheme, the quicker the detection, but the lower the spreading effectiveness.

The FH sequence, the length of the time slots, the number of time slots per frame, the number of available transmission channels, and the beacon signals transmission power are system parameters a priori known by the alerting and warning apparatuses.

After a target apparatus has activated its warning functionality or has entered a new area, it needs to find a Peer Group to join in. To do that, under the above assumptions, first of all it is tuned in one of the available transmission channels and stays tuned there for at least one period of FH sequence. During that period, the target apparatus has the opportunity to receive all the beacon signals that are emitted on each transmission channel and, by analysing the received signals, it can identify, through their headers, the warning apparatuses that are within its reception range. By examining the signal bursts of the detected beacon signals, the apparatus can count how many distinct Peer Groups are in operation and identify the beacon signals belonging to each of them. To determine if a set of beacon signals belong to apparatuses of a common Peer Group, their burst have to fulfil the following three conditions:

fit into time slots spaced as that of a same frame;
be within a time interval equal to one frame period;
hop according to a same hopping sequence.

The cases in which none or more than one Peer Group is identified will be dealt with later on. Now let us consider in which one Peer Group is found and the way the target apparatus gets the needed synchronization to join it, considering that a short range communications system is used and the transmission delays can be neglected.

The first synchronisation step is the alignment of the time slot bounds. Each apparatus of the invention has its own internal clock, which runs independently from the clocks of the others, and each of them, including the target apparatus, determines the length of its time slots from its internal clock. The target apparatus aligns the bounds of its time slots to those of the Peer Group by simply applying a proper shift to its time slot timing. As a time reference, i.e., as a timing of the time slots of the Peer Group, the target apparatus can take the average of all the timings derived from the bursts of the beacon signals of the Peer Group, or the average of those timings excluding the most discrepant values, or a weighted average according to some weighting factors, or another kind of computed reference that the skilled person may devise. In any case, this alignment can be re-adjusted with the time, e.g., every frame period or every FH sequence period, or at another regular time interval or according to some performance criteria, such as when the standard deviation of the timing errors exceeds a given limit. The skilled person can indicate also a number of other criteria suitable for updating the time slot timing. The relative misalignments that different bursts may have can be tolerated as long as the guard times (see above) can cope with them.

The second synchronization step for the target apparatus is setting the timing of its cyclic target frame interval. For this setting there are no constraints from the timings of other apparatuses, but for the need that all the time slots carrying beacon signals of peers be within a time interval equal to the frame period (this is a rather loose constraint, if, as expected in practice, the time slots used by the relevant beacon signals are substantially less than those of the frame, as in the current illustrative example). In the preferred embodiment of the invention, the cyclic time interval of the target frame is set so that the time slots used by the Peer Group be around the centre of the target frame. However other criteria can be used as well, as the skilled person can understand.

The third synchronization step is the alignment of the timing of the FH sequence. If the FH sequence is of the type assumed above for the preferred embodiment of the invention (length equal to the number of used transmission channels), the synchronisation with it can be immediately achieved by matching, in a time slot, the step of the FH sequence with the transmission channel used by an apparatuses of the Peer Group. In case of other kinds of spreading sequence, this synchronisation could be more cumbersome, but the skilled person knows methods to achieve it, as they are part of known art.

If the target apparatus, after the activation of its warning functionality or on entering a new area, does not find any other apparatus, it creates a new Peer Group by simply starting the emission of its beacon signal with its own timings and the given spreading sequence.

If, instead, the target apparatus finds a number of Peer Groups, it has to select one out of them. Possible selection criteria are:
- the Peer Group with at least on vacant time slot;
- the Peer Group with the most powerful beacon signal;
- the Peer Group that totalises the greatest emission power with a given number of the most powerful beacon signals (e.g., the three most powerful beacon signals);
- a weighted combination of some criteria;
- other criteria that the skilled person may envisage, considering the conditions in which the invention is applied.

Finally the target apparatus selects a time slot for emitting its beacon signals with the aim to concentrate the used time slots in a short time interval as much as possible. If no transmission resource is available for the target apparatus, the target apparatus joins the Peer Group anyway, with the emission of its beacon signals halted. In other words, the processing means are also configured for performing the following tasks:

determining, on the basis of the signals received by said receiving means, the availability of transmission resources;

halting the transmission of the beacon signal if the available transmission resources are insufficient for transmitting said beacon signal.

In any case the target apparatus starts receiving beacon signals and processes them to assess collision risks.

Figure 6:
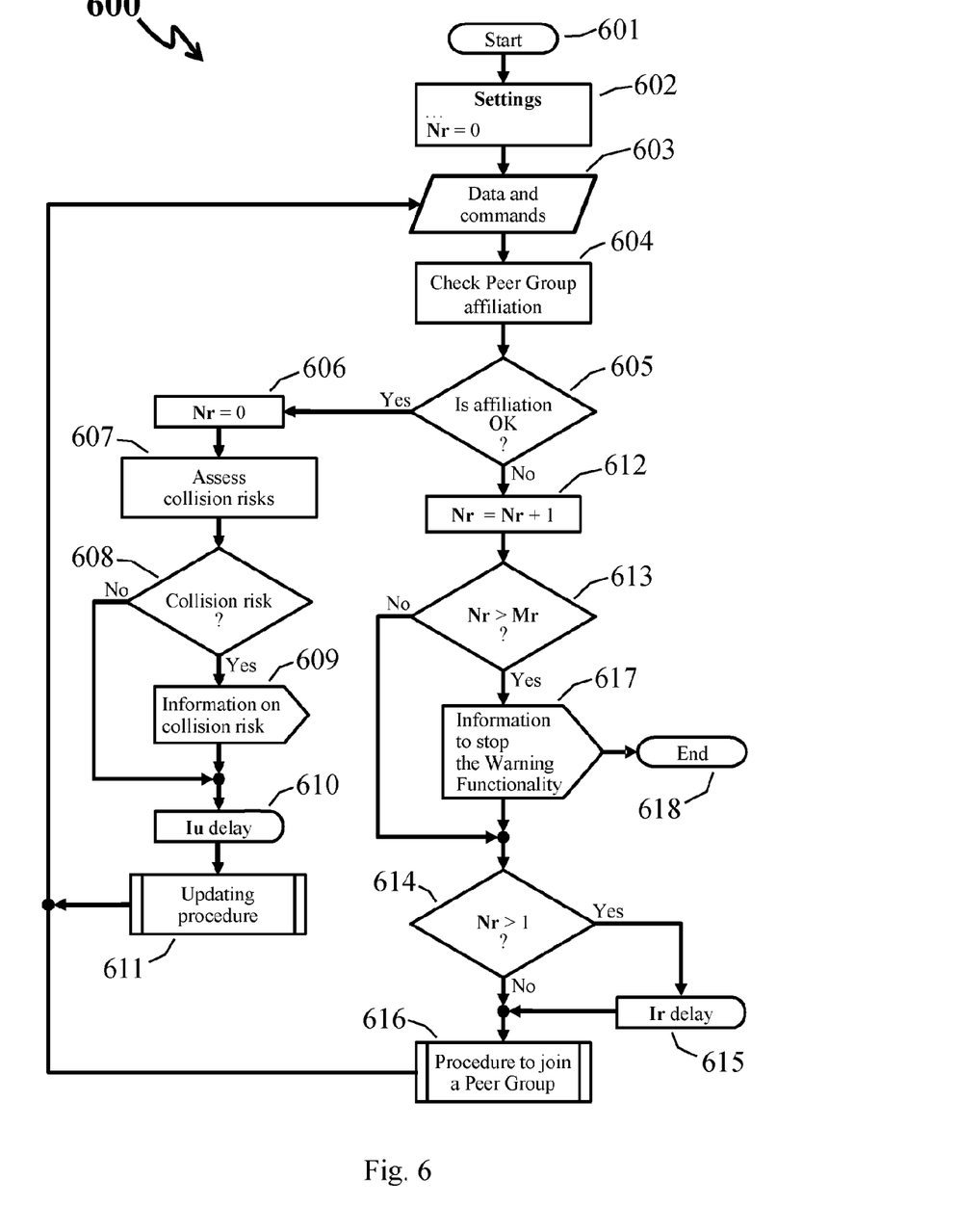
FIG. 6 shows a flow chart of a method for assessing collision risks.
Figure 7:
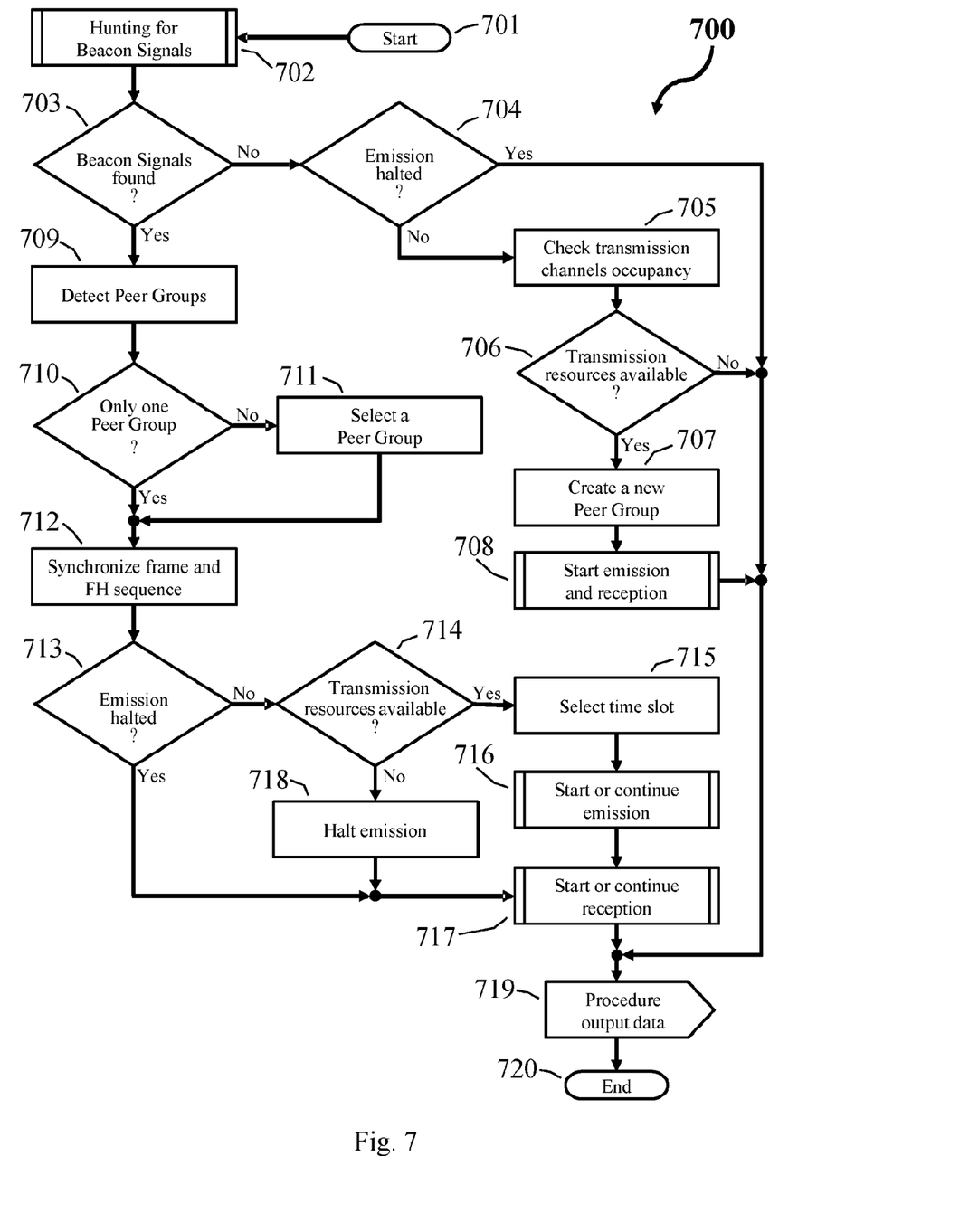
FIG. 7 shows a flow chart of a discovering method by which an alerting apparatus discovers other alerting apparatuses.

The above description of the way the present invention carries out its main tasks is summarized in the exemplary flow charts shown in FIGS. 6 and 7.

The flow chart of FIG. 6 sketches the method for assessing collision risks, according to the following main steps:
601 Start;
602 Settings of parameters; in particular a variable Nr, which is used for counting the number of consecutive failed attempts to join a Peer Group, is set o zero;
603 Data and commands are received, including user commands and results of previous executions of the method and its procedures;
604 Check Peer Group affiliation;
605 Determination on affiliation: if the apparatus does not have a correct affiliation to a Peer Group (e.g., affiliation failed in a previous attempt, synchronization has been lost) the process continues to step 612, otherwise it continues to step 606;
606 Reset Nr to zero;
607 Assess collision risk by analysing at least a property of the received beacon signals;
608 Determination if a collision risk exist: if a collision risk exists, the process continues to step 609, otherwise the process continues to step 610;
609 Output of information on collision risk to activate alerting means;
610 Iu delay, to pass before the process continue to step 611; this delay is for distancing the updates performed at step 611;
611 Updating procedure, by which the process updates its affiliation to a Peer Group. The updating procedure 611 is described in what follows also with reference to FIG. 8;
612 Nr increment: if the determination at step 605 is that the apparatus does not have a correct affiliation to a Peer Group, the number Nr of consecutive failed attempts to join a Peer Group is incremented;
613 Determination on Nr>Mr: if the number Nr of consecutive failed attempts to join a Peer Group has reached a maximum value Mr, the process continues to step 617, otherwise it continues to step 614;
614 Determination on Nr>1: if the preceding attempt to join a Peer Group did not fail (i.e., Nr=1), the process continues to step 616, otherwise it continues to step 615;
615 Ir delay, to pass before retrying to join a Peer Group after a failed attempt;
616 Procedure to join a Peer Group, described in what follows, also with reference to FIG. 7;
617 Information to stop the warning functionality, as at step 613 it has been determined that the allowed maximum number Mr of consecutive failed attempts has been reached;
618 End of method.

Summarizing, a method for reducing collision risks according to the invention comprises the following phases:
a receiving phase, during which a second beacon signal 131,132,133, that can be emitted by a second apparatus 111,112,121 which could dangerously approach to a first apparatus 111,112,121, is received by means of the receiving means 202;

a detecting phase, wherein at least a property of at least said second beacon signal 131,132,133 is detected by means of the processing means 203;

a determination phase, wherein at least a property of the first beacon signal 131,132,133 is determined, by means of processing means (203), on the basis of said at least one property of said second beacon signal;

a transmitting phase, wherein a first beacon signal is emitted through the transmitting means 201.

A discovering method for discovering and joining a Peer Group can be as that depicted by the flow chart of FIG. 7, consisting of the following steps:

701 Start of procedure, as called by the process to assess collision risks;

702 Hunting for beacon signals, by scanning all the transmission channels of the transmission system; in case the spreading sequence is of the type assumed for the preferred embodiment, the target apparatus tunes in a channel radio and stays tuned in it at least for a frame period, as said above;

703 Determination on the beacon signals found: if at least one beacon signal has been found, the procedure continues to step 709, otherwise it continues to step 704;

704 Determination on emission: if the emission of beacon signals by the target apparatus is halted (see step 718), the procedure continues to step 719, returning the relevant information to the calling process and then coming to the end 720; if the emission of beacon signals is not halted, the procedure continues to step 705;

705 Check transmission channels occupancy: to identify time slots suitable for emitting a beacon signal and assess interference levels;

706 Determination on the transmission resource: if a beacon signal cannot be emitted by the target apparatus, the procedure continues to step 719, otherwise it continues to step 707;

707 Create a new Peer Group, which comprises the target apparatus only;

708 Start emission and reception by the target apparatus; then the procedure continues to step 719;

709 Detect Peer Groups: if at step 703 the determination is that some beacon signal has been found, the target apparatus detects how many distinct Peer Groups are in operation and identify the beacon signals belonging to each of them;

710 Determination on the number of Peer Groups: if only one Peer Group has been found the procedure continues to step 712, otherwise it continues to step 711;

711 Select a Peer Group for the target apparatus to join in;

712 Synchronize frame and FH sequence, as said above;

713 Determination on emission: if the emission of beacon signals by the target apparatus is halted (see step 718), the procedure continues to step 717, otherwise it continues to step 714;

714 Determination on the transmission resource: if no transmission resource is available for the beacon signal of the target apparatus, the procedure continues to step 718 and the target apparatus halts the emission of its beacon signal, while it can start or continue reception at step 717. If time slots are available for the target apparatus, the procedure continues to step 715;

715 Select time slot with the aim to concentrate the used time slots in a short time interval;

716 Start or continue emission in the selected time slot;

717 Start or continue reception;

718 Halt emission as no transmission resources are available;

719 Procedure output data are returned to the calling process (which may be the application running on the mobile terminal 111,112);

720 End of procedure.

In the alerting scenario, the alerting apparatuses that are within the reception range of a target apparatus can change over time. In particular, apparatuses that are affiliated to other Peer Groups can come into the reception range of the target apparatus, but, during its regular operation, the target apparatus cannot be aware of them, as it is adapted to receive only the beacon signals that hop with the timing of its Peer Group. However, sometimes for an alerting apparatus it could be convenient to leave its current Peer Group and join in another one including closer potential obstacles. To allow an alerting apparatus to detect beacon signals coming from apparatuses not belonging to its Peer Group, the invention provides an updating procedure that is now described also with reference to FIG. 8.

Figure 8:
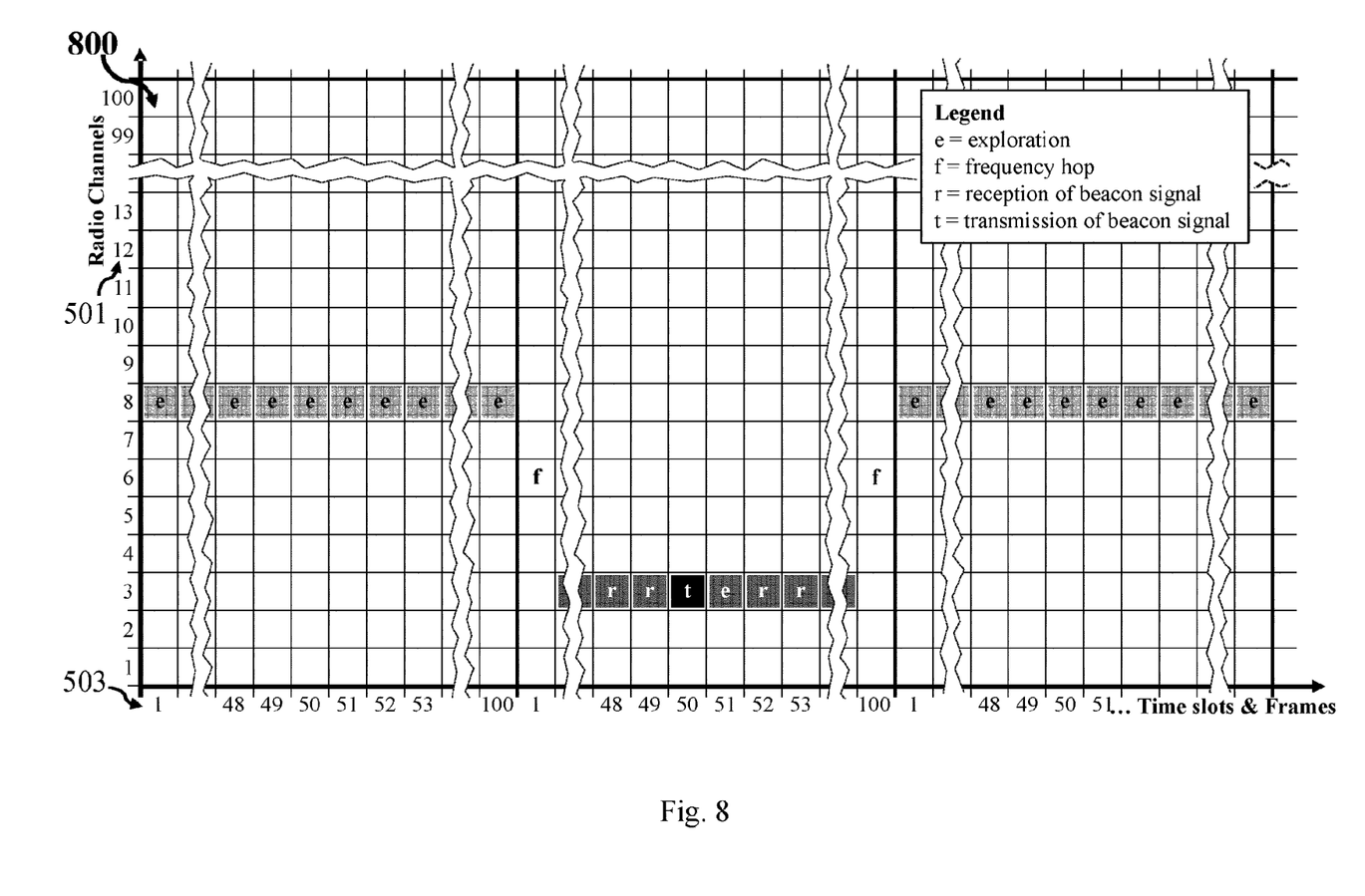
FIG. 8 shows a frame scheme by which an alerting apparatus updates its data on the warning scenario.

The updating procedure is based on the use of two kind of frames that alternate: a regular target frame and an "exploration frame".

An example of these two frames and their possible alternation is shown in FIG. 8, assuming that the regular frame hops according to an FH sequence having a length equal to the number of transmission channels (same conditions assumed above for the preferred embodiment of the invention). With this example, an exploration frame (the first and the third frame in FIG. 8) alternates with one regular frame (the second frame in FIG. 8). If the number of transmission channels is an odd number, the alerting apparatus is tuned in a given exploration channel for the whole period of the exploration frame and a number of exploration frames at least equal to the number of transmission channels. If the number of transmission channels is an even number, the alerting apparatus is tuned in a first exploration channel, corresponding to a first step of the FH sequence, for a number of exploration frames at least equal to half the number of transmission channels, while for another number of exploration frames at least equal to half the number of transmission channels, the alerting apparatus is tuned in a second exploration channel corresponding to a second step of the FH sequence, which shall be of odd number if said first step is of even number, and vice versa. By this way the alerting apparatus can look into all the transmission resources (all the time slots of all the transmission channels) and detect all the beacon signals that are within its reception range.

For practical implementation issues, some time intervals are to be allocated for the transients associated to the re-tunings. These are included within the regular frames (time slots labelled "f" in FIG. 8), to have the full time of the exploration frames actually devoted to detecting beacon signals, considering that, generally, the beacon signals of a Peer Group do not occupy all the time slots of regular frames. Moreover, when the hopping regular frame takes the same frequency as that of the non-hopping exploration frame, the target apparatus stays tuned in the corresponding channel for a time interval of three consecutive frames (the regular frame and the two non-hopping adjacent exploration frames), so that it has the opportunity to look into all the times slot of that transmission channel three times except for the time slot it uses for emitting its own beacon signal which can be explored two times only, since in the regular frame the target apparatus cannot receive signals while it is transmitting its own beacon signal burst. Notice that the time slots of the regular frame that are not used by peers (e.g., time slot 51 of the second frame, in FIG. 8) can be used for exploration purposes.

Except when the regular frame takes the same transmission channel of the exploration frame, during the exploration frames the alerting apparatus cannot detect any property of the beacon signals coming from its peers (i.e., the other members of its current Peer Group), so, for the assessment of collision risks, it works as if the frame period were doubled, but this could be acceptable, as said above. Similarly, during the exploration frames of a target apparatus the other apparatuses do not receive beacon signals from the target apparatus, but for the same reasons this can be acceptable as well.

If a double frame period or the time required for the exploration procedure would be too long, one can utilize two receivers and parallelise tasks. Moreover, without departing from the basic ideas of the invention, the skilled person can suggest other ways to alternate exploration frames and regular frames (e.g., one exploration frame every two regular frames, or vice versa), in particular in cases in which the type of the used FH sequence differs from that assumed above.

All the phases according to the method of the present invention may be performed by a mobile apparatus (e.g., a mobile phone, a smartphone, a tablet, a wearable device such as a smartwatch, smart-glasses, or the like) according to the state of art. Said mobile apparatus is configured for executing a software implementing all the phases of the method according to the invention; the set of instructions of said software can be stored into the memory of said terminal by the manufacturer, or can be downloaded from a server via a communication network (e.g., by downloading through the Internet an application from an online shop, such as Google Play©, App Store, or the like) and then stored/installed in the memory of said mobile apparatus.

Finally, the apparatus and the method according to the invention can be used for avoiding collision not only between a user and an obstacle, but also between a generic entity (e.g., a personal vehicle such as an electric monocycle, a self-balancing scooter, a bicycle, or the like) and an obstacle.

The present description has tackled some of the possible variants, but it will be apparent to the man skilled in the art that other embodiments may also be implemented, wherein some elements may be replaced with other technically equivalent elements. The present invention is not therefore limited to the explanatory examples described herein, but may be subject to many modifications, improvements or replacements of equivalent parts and elements without departing from the basic inventive idea, as set out in the following claims.

The invention claimed is:

1. An apparatus configured to reduce a risk of a physical collision between the apparatus and a second apparatus, said apparatus comprising:
 transmitting means adapted to emit a first beacon signal;
 receiving means adapted to receive a second beacon signal that is intermittently emitted by the second apparatus, which is physically approaching said apparatus, said second apparatus being a peer in a peer group in which the apparatus is also included, wherein the apparatus joins the peer group by:
  causing the receiving means to be tuned, for at least a full period of a frequency hopping sequence, to one transmission channel that is included in a plurality of transmission channels;
  during the full period of the frequency hopping sequence in which the receiving means is at least tuned to the one transmission channel, causing the receiving means to additionally receive all beacon signals that are emitted on other transmission channels included in the plurality of transmission channels; and
  based on an analysis said all beacon signals, selecting the peer group to join;
 processing means in signal communication with said transmitting and receiving means, wherein said processing means is configured to:
  detect a second beacon signal received through the receiving means;
  detect a second property of the second beacon signal;
  determine, on a basis of the second property, a first property of the first beacon signal;
  intermittently emit the first beacon signal through the transmitting means based on the first property, wherein the first beacon signal and the second beacon signal are structured to not overlap one another;
  determine a power of the second beacon signal;
 determine a transmit power of the second beacon;
  determine a distance between said apparatus and said second apparatus based on the determined power and the transmit power of the second beacon signal; and
 in response to the distance being less than a threshold distance, trigger an alert to alert a user of the apparatus regarding a potential physical collision with the second apparatus,
  wherein the first property of the first beacon signal comprises first timing information defining a timing of the first beacon signal,
 wherein the second property of the second beacon signal comprises second timing information defining a timing of the second beacon signal,
  wherein the first and second beacon signals are aligned in different time slots in a period,
  wherein a third property of the first beacon signal comprises first channel information defining a first sequence of communication bands in which the first beacon signal will be emitted, and
 wherein a fourth property of the second beacon signal comprises second channel information defining a second sequence of communication bands on which the second beacon signal has been received.

2. The apparatus according to claim 1, wherein said processing means is configured to determine, on a basis of said second sequence of communication bands, the first sequence of communication bands, wherein the first and second sequences of communication bands become the same.

3. The apparatus according to claim 2, wherein said processing means is also configured for receiving, through the receiving means, at least a third beacon signal emitted by a third apparatus on a third sequence of communication bands,
 wherein said processing means is further configured for:
  identifying a set of apparatuses on a basis of the first property of said first beacon signal and/or the second property of the second beacon signal;
  selecting a group of apparatuses on a basis of reception information comprising one or more of: strongest received beacon signal per group or average/cumulative received power per group; and
determining said the first property of the first beacon signal also on a basis of the selected group of apparatuses,
wherein a fifth property of the first beacon signal comprises first identity information configured to enable identification of said apparatus, and
wherein a sixth property of the second beacon signal comprises second identity information configured to enable identification of the second apparatus.

4. The apparatus according to claim 1, further comprising alerting means adapted to produce the alert.

5. The apparatus according to claim 4, wherein a different property of said second beacon signal comprises signal strength.

6. The apparatus according to claim 4, wherein detecting the second beacon signal is triggered in response to a detected event, and wherein the detected event includes one or more of the following: (i) activation of a display of the apparatus and (ii) detection of an acoustic noise.

7. The apparatus according to claim 1, wherein said second beacon signal is an ultrasound wave, and wherein said processing means is configured for:
computing a difference between a frequency of the second beacon signal received through said receiving means and a reference frequency value;
computing an approaching speed of the second apparatus based on said difference; and
activating an alerting means when the approaching speed of the second apparatus is greater than a threshold value.

8. The apparatus according to claim 1, wherein the apparatus is adapted to forward the alert to a secondary device selected from a group including a watch or an earphone, which is capable to output a sensible warning signal.

9. A method for reducing a risk of a physical collision between a first apparatus and a second apparatus, said method being performed by the first apparatus and comprising:
emitting a first beacon signal;
receiving a second beacon signal that is intermittently emitted by the second apparatus, which is physically approaching the first apparatus, wherein the second apparatus is a peer in a peer group in which the first apparatus is also included, and wherein the first apparatus joins the peer group by:
causing the first apparatus to be tuned, for at least a full period of a frequency hopping sequence, to one transmission channel that is included in a plurality of transmission channels;
during the full period of the frequency hopping sequence in which the first apparatus is at least tuned to the one transmission channel, causing the first apparatus to additionally receive all beacon signals that are emitted on other transmission channels included in the plurality of transmission channels; and
based on an analysis said all beacon signals, selecting the peer group to join;
detecting a second beacon signal;
detecting a second property of the second beacon signal;
determining, on a basis of the second property, a first property of the first beacon signal;
intermittently emitting the first beacon signal based on the first property, wherein the first beacon signal and the second beacon signal are structured to not overlap one another;
determining a power of the second beacon signal;
determining a transmit power of the second beacon;
determining a distance between the first apparatus and the second apparatus based on the determined power and the transmit power of the second beacon signal; and
in response to the distance being less than a threshold distance, triggering an alert to alert a user of the first apparatus regarding a potential physical collision with the second apparatus.

10. The method according to claim 9, wherein detecting the second beacon signal is triggered in response to an activation of a display of the first apparatus.

11. The method according to claim 9, wherein detecting the second beacon signal is triggered in response to a detection of an acoustic noise.

12. The method according to claim 9, wherein the alert is a signal that is differentiable based on a determined type of the second apparatus.

13. The method according to claim 9, wherein the frequency hopping sequence is a part of a frequency hopping scheme where, in each frame period, all beacon signals of a target frame use time slots of a same radio channel, and where the radio channel changes every frame period.

14. The method according to claim 9, wherein the frequency hopping sequence has a length equal to a number of radio channels that the first beacon signal uses, and wherein the frequency hopping sequence repeats cyclically such that in each cycle of the frequency hopping sequence, all the radio channels are used once.

15. A computer system comprising:
one or more processors; and
one or more hardware storage devices that store instructions that are executable by the one or more processors to cause the computer system to:
emit a first beacon signal;
receive a second beacon signal that is intermittently emitted by a second system, which is physically approaching the computer system, wherein the second system is a peer in a peer group in which the computer system is also included, and wherein the computer system joins the peer group by:
tuning, for at least a full period of a frequency hopping sequence, to one transmission channel that is included in a plurality of transmission channels;
during the full period of the frequency hopping sequence in which the computer system is at least tuned to the one transmission channel, receiving all beacon signals that are emitted on other transmission channels included in the plurality of transmission channels; and
based on an analysis said all beacon signals, selecting the peer group to join;
detect a second beacon signal;
detect a second property of the second beacon signal;
determine, on a basis of the second property, a first property of the first beacon signal;
intermittently emit the first beacon signal based on the first property, wherein the first beacon signal and the second beacon signal are structured to not overlap one another;
determine a power of the second beacon signal;
determine a transmit power of the second beacon;

determine a distance between the computer system and the second system based on the determined power and the transmit power of the second beacon signal; and in response to the distance being less than a threshold distance, trigger an alert to alert a user of the computer system regarding a potential physical collision with the second system.

* * * * *